United States Patent

Rekstad et al.

[11] Patent Number: 6,014,967
[45] Date of Patent: Jan. 18, 2000

[54] OPERATING METHOD FOR A SOLAR COLLECTOR PLANT, AND CONTROL UNIT FOR A LIQUID PUMP IN A SOLAR COLLECTOR PLANT

[75] Inventors: John Rekstad, Nedre Gronlivei 31B, N-1472, Fjellhamar; Bard Bjerke, Bekkestua; Michaela Meir, Oslo, all of Norway

[73] Assignee: John Rekstad, Fjellhamar, Norway

[21] Appl. No.: 09/117,629

[22] PCT Filed: Jan. 31, 1997

[86] PCT No.: PCT/NO97/00027

§ 371 Date: Oct. 21, 1998

§ 102(e) Date: Oct. 21, 1998

[87] PCT Pub. No.: WO97/28410

PCT Pub. Date: Aug. 7, 1997

[30] Foreign Application Priority Data

Feb. 2, 1996 [NO] Norway ................................... 960452

[51] Int. Cl.[7] .................................................... F24J 2/40
[52] U.S. Cl. .......................... 126/592; 126/646; 126/714; 126/678; 126/595
[58] Field of Search ..................................... 126/714, 595, 126/585, 592, 678, 646, 664

[56] References Cited

U.S. PATENT DOCUMENTS

| 4,191,166 | 3/1980 | Saarem . | |
| 4,221,210 | 9/1980 | Cvijanovich | 126/678 |
| 4,300,534 | 11/1981 | Bowen | 126/646 |
| 4,414,961 | 11/1983 | Luebke . | |
| 5,601,075 | 2/1997 | Lai | 126/585 |

FOREIGN PATENT DOCUMENTS

| 3041236 | 6/1982 | Germany . |
| 1541222 | 2/1979 | United Kingdom . |

*Primary Examiner*—Ira S. Lazarus
*Assistant Examiner*—Sara Clarke
*Attorney, Agent, or Firm*—Ladas & Parry

[57] ABSTRACT

A solar collector having a radiation absorber (1) has a number of channels for conducting heat receiving liquid, said channels accommodating particles for capillary effect to lift the liquid to effectively sweep the sun-facing surface layer of the absorber. The solar collector is started after a prolonged operation standstill by driving a liquid pump (7) intermittently by a control unit (13) acting according to a clock-controlled program. In the intermittent start-up phase, first the pump (7) is driven for 2–4 minutes, thereafter it is shut down for a time span of about 20–60 seconds, and this is repeated two or three times before a continuous operation phase is started. Thereby air in the absorber (1) channels is expelled more rapidly.

15 Claims, 8 Drawing Sheets

Dark areas: Liquid-filled volume
Bright areas: air-filled volume

Fig. 10
Corresponds to Fig. 3

Fig. 11
Corresponds to Fig. 5

Dark areas : Liquid-filled volume
Bright areas: air-filled volume

Fig. 12

Corresponds to Fig. 6

Fig. 13

Corresponds to Fig. 7

OPERATING METHOD FOR A SOLAR COLLECTOR PLANT, AND CONTROL UNIT FOR A LIQUID PUMP IN A SOLAR COLLECTOR PLANT

BACKGROUND OF THE INVENTION

The present invention relates to a certain kind of solar collector plant, and more precisely an operating method for a special solar collector plant. The method comprises use of a control unit for a liquid pump in the plant, and one aspect of the invention concerns such a control unit also.

The special solar collector plant referred to here, is disclosed in applicant's own prior Norwegian patent application no. 94.3257, which relates to a solar collector having a radiation absorber with a channel system for conducting a liquid which removes heat from a surface layer heated by incident sunbeam radiation. The special feature of this prior application is that the liquid channels in the absorber are filled with particles, e.g. globular, ceramic particles with dimension in the range 2–4 mm, which particles lift the liquid by means of a capillary effect to contact with the surface layer above. Thereby a good thermal contact with the surface layer is ensured without simultaneously filling the channels with the liquid, and hence a build-up of a liquid pressure in the channel system is avoided.

However, there exists a problem with the prior device, namely that when liquid is supplied from above through a distributor at the channel starting points on the top (usually the absorber has a slanted position), the liquid will normally not be distributed in a perfect manner to every one of the through-going and particle-filled channels in the absorber. The liquid will only flow through some of the channels, which leads to a situation where less than the complete surface layer is subject to effective cooling. This state seems to be metastable, and it may remain unchanged for a period of as much as 1–2 hours. The reason is that the space between the particles in the channels is originally filled with air. When a liquid is supplied, the air is partly expelled, and it is brought along with the liquid down through the channel and out of the absorber. At the same time this leads to a small increase of pressure in the air in the channels where liquid is not flowing, and this seems to be the mechanism which maintains the metastable state. Thus, the problem to be solved is to achieve disruption of the metastable state as soon as possible, so that liquid filling can be effected more rapidly in all channels.

From U.S. Pat. No. 4,414,961 there is known an operating method for a solar collector plant of a somewhat different type than the plant according to NO-94.3257, but with some similar features, e.g. the use of a liquid circulation pump working in a start-up phase and a continuous operation phase.

Further, U.S. Pat. No. 4,191,166 discloses a control unit for a pump providing liquid circulation in a solar collector plant, which control unit comprises a computer having a clock for controlling switch-on and shut-down times for the pump.

However, none of the above U.S. patents teach pumping systems that will be able to remove air efficiently from a solar collector plant of the general type disclosed in the above mentioned NO-94.3257, in which the liquid channels in the radiation absorber unit are filled with e.g. globular, ceramic particles.

SUMMARY OF THE INVENTION

The invention aims at solving the problem by providing a special start-up procedure for the plant after a prolonged shut-down, and by providing a special control unit for the liquid pump which drives the liquid flow through the plant.

Prior art starting procedures for solar collector plants comprise, as far as is known to the inventors, only pure thermostat functions, and in addition dynamic control related to the sunbeam radiation is used. This means that a liquid pump is switched on for starting heat transport by means of the liquid e.g. when a measured temperature or a measured temperature difference exceeds a predetermined threshold, and it is possible to increase or decrease the flow rate, i.e. the pump power in accordance with an increase or a decrease in a measured temperature or a measured temperature difference, to vary the heat transport rate from the solar collector itself to the heat store.

The present invention attacks, as mentioned above, the problem of achieving a rapid distribution of liquid to all channels in a radiation absorber having capillary particles, and thus relates to something quite different than previously known start procedure techniques. Thus, the invention defines an operating method for a solar collector plant. The invention also relates to a control unit for the pump providing liquid circulation in the solar collector plant.

BRIEF DESCRIPTION OF THE DRAWINGS

In the following the invention will be illuminated further by a discussion of embodiment examples, and it is at the same time referred to the appended drawings, where.

DETAILED DESCRIPTION OF THE INVENTION

In a thermal solar collector the radiation energy of the sunlight is converted to heat. This heat leads to a temperature increase in the light absorbing surface of the solar collector.

The heat is transferred further to a cooling medium, e.g. water, which cooling medium flows through a pipe system in thermal contact with the light absorbing surface and further to a heat store external to the solar collector. Thereby the temperature of the solar collector can be reduced, while the solar collector continuously delivers energy in the form of heat to the heat store.

The efficiency of a solar collector is to a large degree determined by the design of the cooling system and the governing of the cooling function. Inadequate cooling causes a rise in the solar collector temperature, which in turn leads to an increasing energy loss to the surroundings in the form of heat conduction, radiation and convection. The proportion of the solar energy transported to the heat store for further utilization, is then reduced correspondingly.

Figure 1:
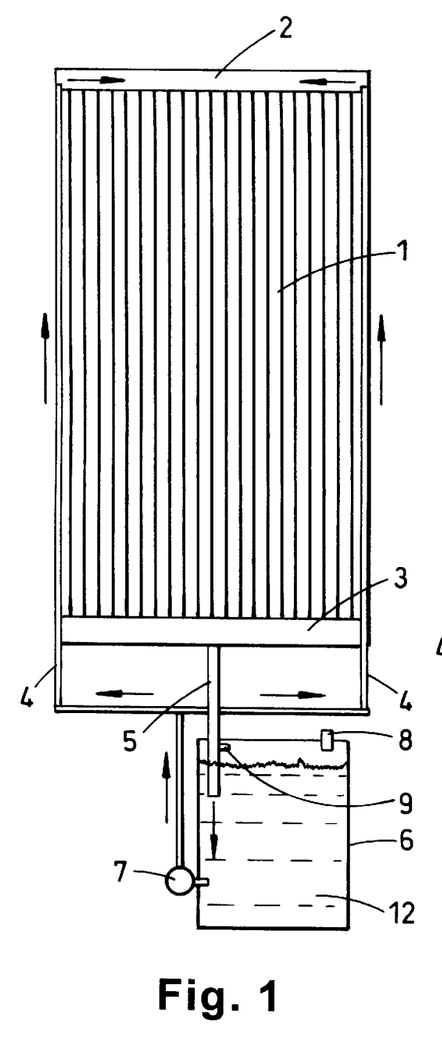
FIG. 1 shows a schematic drawing of a solar collector of the type which is of interest in connection with the invention, attached to a liquid circulation system and a heat store in the form of a tank containing cooling liquid.

The design of the cooling system with the intent to achieve the best possible thermal contact between the light absorbing surface and the cooling system, is of paramount importance regarding the efficiency of the solar collector. In the special solar collector plant mentioned in the introduction (Norwegian patent application no. 94.3257) there is preferably used a radiation absorber of a plastic material, shown in FIG. 1 schematically as reference numeral 1, and more detailed as to construction in FIG. 2. The geometrical structure of the radiation absorber 1 appears clearly in FIG. 2, with a large number of through channels separated by means of partition walls 10, see the enlarged part of FIG. 2. The channels have rectangular cross sections through which the cooling liquid 12 flows. In order to bring the liquid into good thermal contact with the surface layer on the sunny side, which layer is heated directly by solar radiation, absorbing light, the through-going channels are filled with particles 11 in a size range of 2–5 mm, see the enlarged part of FIG. 2. These particles 11 create capillary forces when a liquid is injected to flow through the channels under influence from gravity, with the result that the liquid in an efficient manner sweeps the underside of the light absorbing surface layer. Thereby effective cooling is achieved without a simultaneous build-up of a liquid pressure in the channel system. This is essential for safety reasons as well as cost reasons, since the dimensioning of the absorber 1 does not need to take into consideration the pressure build-up that may occur in a closed circulation system. (The wide and downward directed arrow in the enlarged part of FIG. 2 merely indicates in a symbolic manner energy transport, and has no special meaning.)

Thus, in a continuous operation situation, one attempts to obtain the best possible liquid filling, i.e. in all channels and from the distribution channel 2 on the top to the collecting channel 3 in the lower end of the absorber (the absorber is presumably tilted, e.g. on a sloping roof). As mentioned at the beginning, such a filling condition is not necessarily achieved when the pump 7 is started after a prolonged stoppage, thereafter to drive continuously. Before start-up of the pump 7, the volume between the particles 11 in the absorber channels is filled with air, and so are the distribution and collecting channels. The only exit possibility for the air is through an outlet pipe 5 down into the tank 6. When the pump starts, the liquid will choose in a stochastic manner to flow through certain ones of the absorber channels, while the remaining channels remain filled by air. The previously mentioned metastable state with lacking filling of several of the downward channels, will then occur. This state entails that heat is transferred to the liquid only from certain areas of the absorber. However, the present invention has as its object to be able to establish and maintain the desired flow condition in the absorber rapidly and effectively, in a situation with a low liquid flow rate and using minimum energy for the pump operation.

Figure 2:
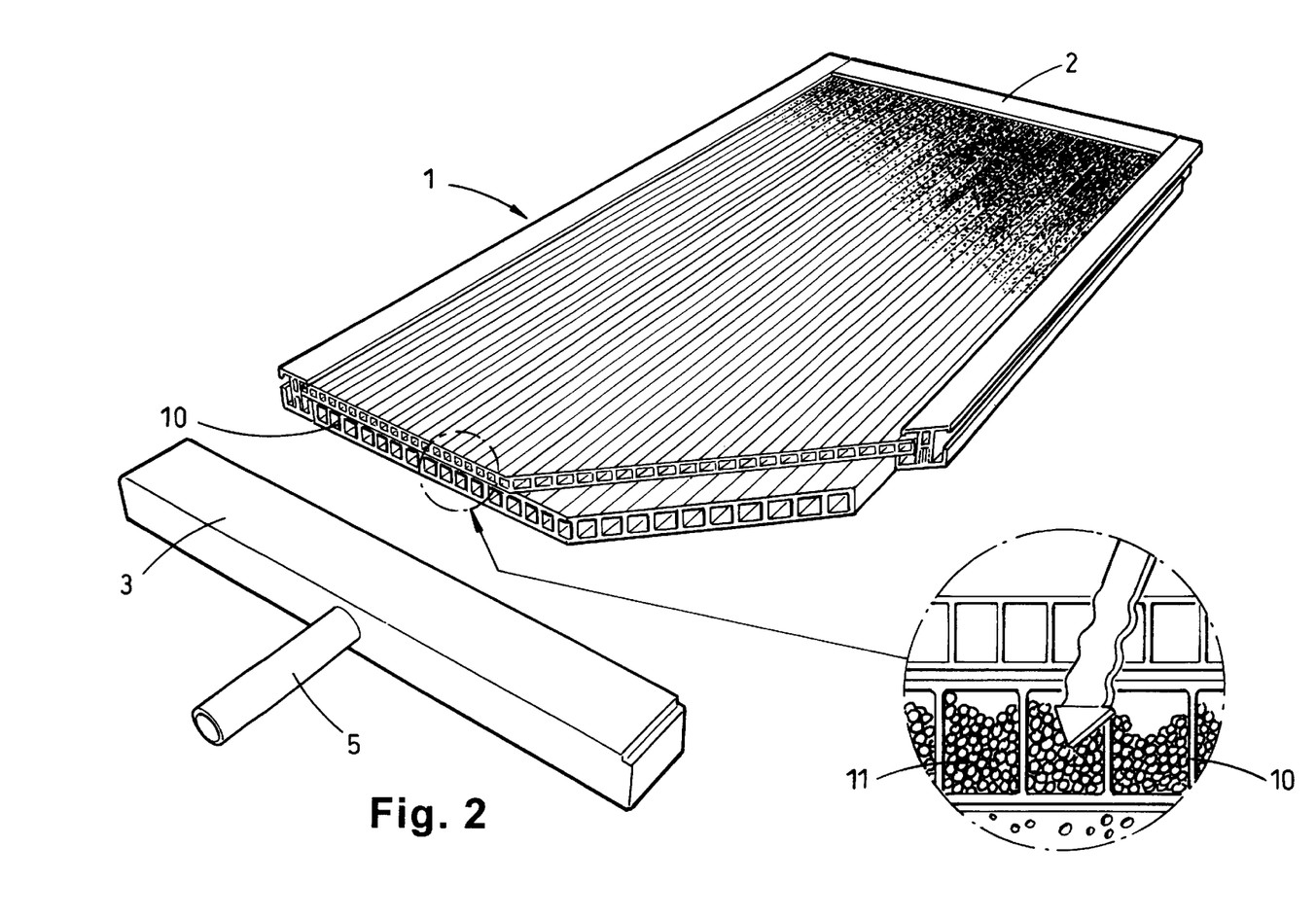
FIG. 2 shows a perspective drawing of the solar collector absorber appearing in FIG. 1, in a partially exploded and sectioned view, and with an enlarged area for indicating particle filling.

Still referring to FIGS. 1 and 2, it should be noted for completeness, that reference numeral 5 indicates an outlet pipe from the absorber collecting channel 3, and with a mouth ending below the water surface in the heat store/cooling liquid tank 6. Reference numeral 4 indicates a supply pipe up to the absorber distribution channel 2 from the pump 7, reference numeral 9 shows a small pipe opening for air, said pipe opening providing for liquid drainage from the absorber when the pump is subject to a lengthy stoppage, and reference numeral 8 indicates an open pipe to the open air, to ensure that the pressure in the tank 6 is equal to the atmospheric pressure.

Figure 3:
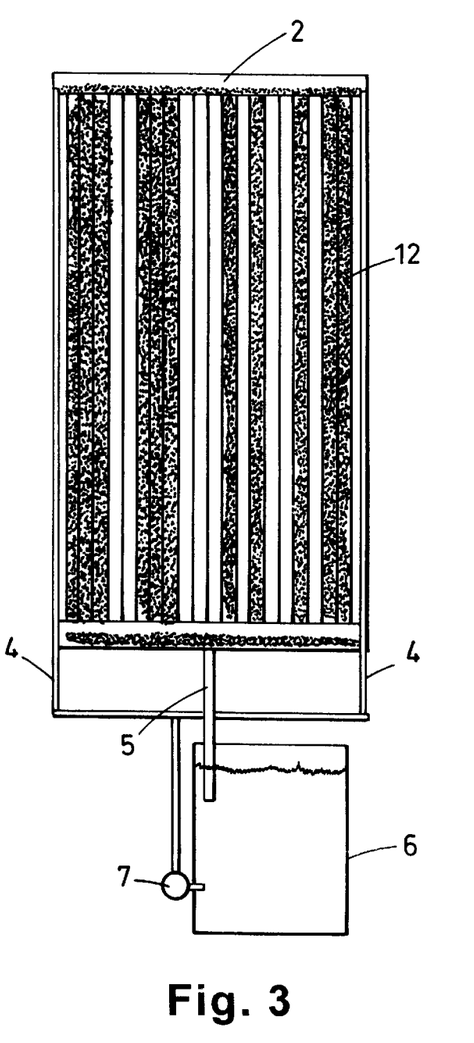
FIG. 3 shows, in a corresponding view as in FIG. 1, a "problematic" start situation where certain channels are not filled by liquid from the start.
Figure 4:
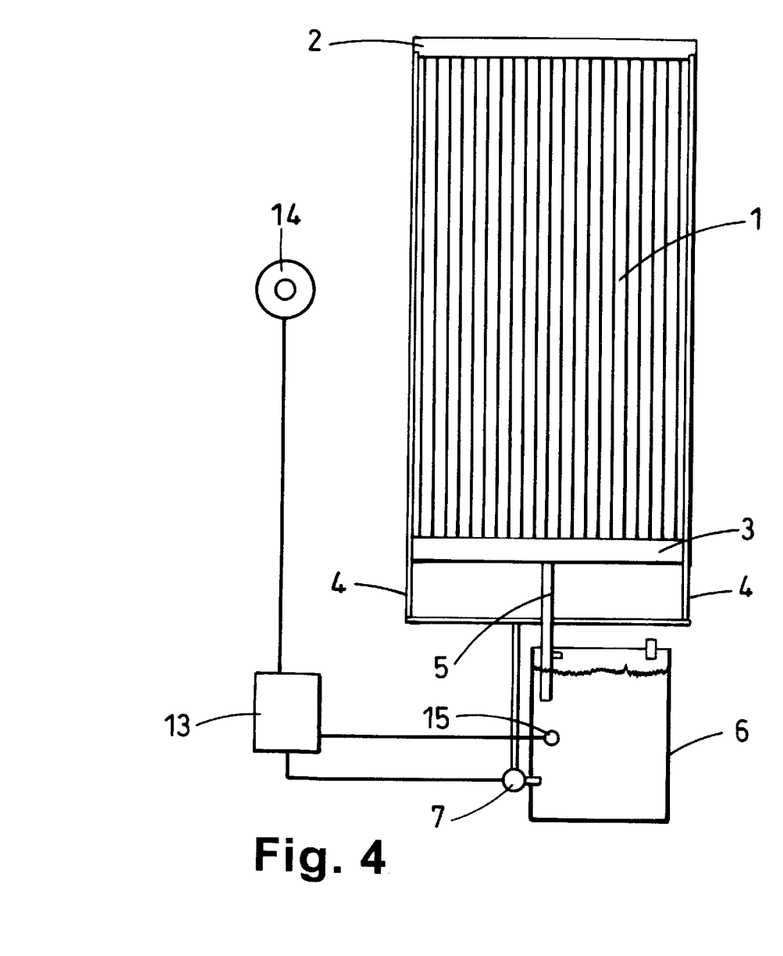
FIG. 4 shows the same as FIG. 1, however with an attached control unit for the liquid pump for the circulation system.

In order to obtain as rapidly as possible the perfect distribution of cooling liquid 12 in all particle-filled channels, the following method has been developed:

1. The pump is started in a normal manner, e.g. on the basis of an established value for solar intensity, measured by means of sensor 14 adjacent to the radiation absorber 1, and a temperature value measured by sensor 15 in the heat store 6, the control unit then starting the pump. After a short time a state in the absorber is achieved where liquid flows as shown in FIG. 3, i.e. some channels are still without liquid ("shadowing" indicates presence of liquid 12, while a white area represents air, i.e. no liquid). As explained previously, such a condition may stay unchanged during a time period of as much as a couple of hours, unless special measures are taken.

2. After a short operating time, the pump is then stopped, typically after 2–4 minutes. As will be remembered in the situation shown in FIG. 3, there was air in some of the channels, while air had been removed, i.e. been expelled by liquid, in some of the channels. Due to the stop which has now been made, an equalization will take place. It is referred to FIG. 5. The air which has been removed in the channels through which the liquid flowed in the first run period, has been brought out of the absorber. The remaining amount of air in the absorber is not sufficient for filling the whole volume. Thus, when the pressure shall be equalized after stopping the pump, the liquid will gather in the lower part of the absorber, and then in all channels, such a appears from FIG. 5, while the upper part of all channels is filled with the air amount present. In practice, this entails that the pressure inside the absorber is now somewhat lower than the atmospheric pressure outside. A typical time for such pressure equalization is 20–60 seconds.

3. The pump is started anew after about 20–60 seconds. The established (under-) pressure is equal in all channels when the pump is started. This contributes to distributing the liquid which is now pumped up through the supply pipes 4, more effectively between channels than in the first pumping sequence. The remaining liquid 12 in the lower end of the absorber in the situation shown in FIG. 5, leaves the absorber through the collecting channel 3 and the outlet pipe 5, while liquid enters the channels on the top via the distribution channel 2. Once again air will be transported by the liquid 12 out of the absorber 1. This entails that the air amount in the absorber is further reduced, compared to the accessible volume in the channels between the particles.

Figure 5:
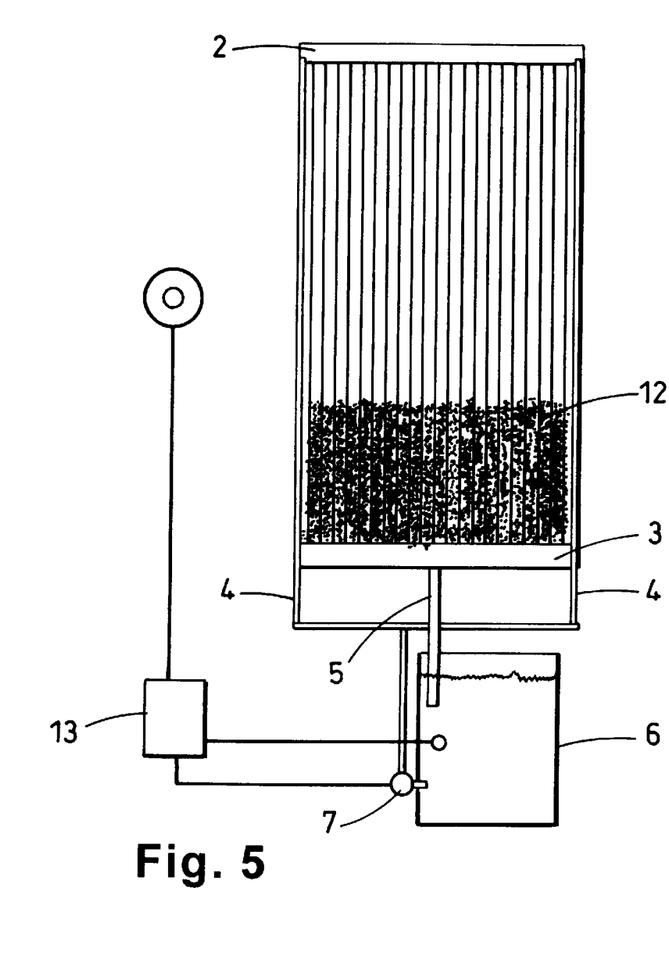
FIG. 5 shows in a corresponding view as FIG. 4, a situation during the start-up procedure in accordance with the invention.

4. The pump is stopped after further 2–4 minutes of operation. Once again, the remaining air will be distributed equally among the channels in the upper part of the absorber, so that a situation as shown in FIG. 5 once more arises, however with the distributed liquid 12 reaching a higher level than just after the first stop.

Figure 6:
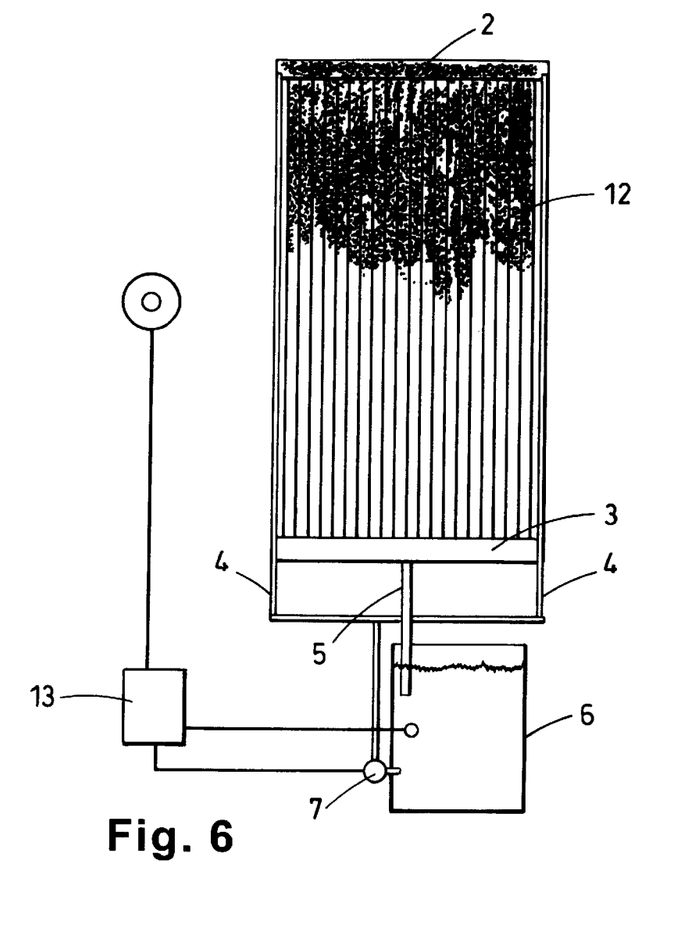
FIG. 6 shows in a corresponding manner as in FIG. 5 a further situation during the start-up procedure.
Figure 7:
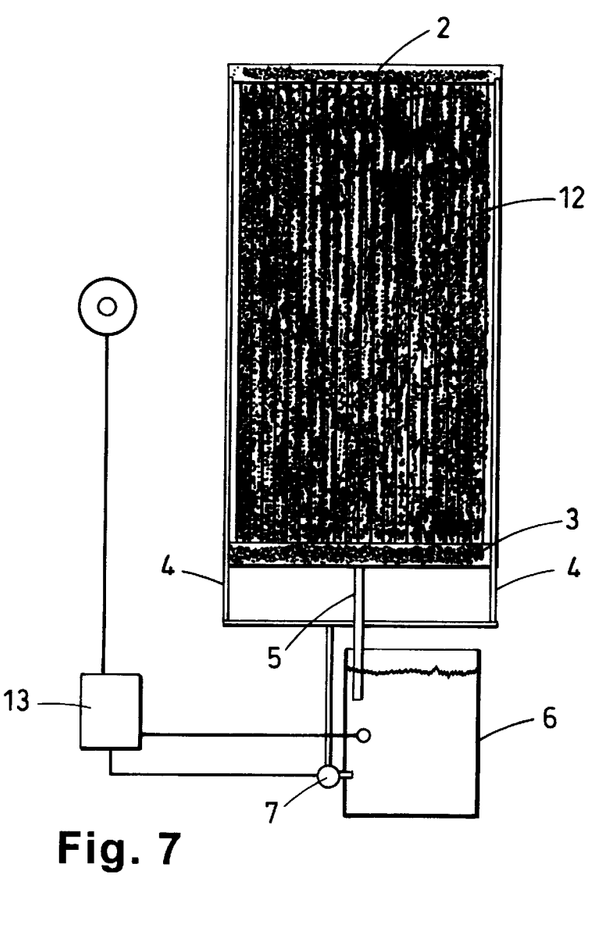
FIG. 7 shows the desired operating situation achieved after successful accomplishment of the start-up procedure.

5. The pump is then re-started after about 20–60 seconds. The process is repeated, and the liquid is distributed even more effectively among the channels. A situation as shown in FIG. 6, where liquid 12 is pumped into substantially all of the channels, may now be the actual situation, possibly after one further repetition of the procedure. FIG. 6 shows a situation where liquid is about to enter the channels, and in FIG. 7 is shown a desired situation where the operation takes place in a continuous manner, where all channels are filled with liquid, and all air has been expelled from the channels.

The starting procedure including pump operation during 2–4 minutes and stop of the pump operation for 20–60 seconds is normally repeated 3–4 times. By then a uniform and complete distribution of liquid has been achieved through all the absorber channels, and the operating pressure in the absorber is by then lower than the atmospheric pressure outside.

The pressure reduction, which is a consequence of the fact that the larger part of the air that was originally inside the absorber, has been expelled from the system, entails that the liquid circulation increases when the pump operating power is maintained constant. In addition to the starting procedure described above, one also aims at a reduction of the pump power so as to maintain the circulation rate constant.

For use in the above described method, a special, microprocessor-based control unit 13 has been developed for the pump 7 which drives the circulation through the liquid transport system. (In principle it is not necessary to use a microprocessor, but a computer or a logic/calculating circuit which can be programmed, receive measurement values and produce control signals subsequent to a calculation on the basis of received measurement values, will be necessary.) The main parameters for the control process will in a preferred embodiment be the intensity of the solar radiation impinging on the absorber 1, measured by means of a special sensor 22, and the temperature in the heat store 6 to which the solar collector delivers heat, measured by means of a temperature sensor 15. One may possibly consider replacing the solar intensity with a temperature in or nearby the absorber. When the solar radiation (or possibly the absorber temperature) exceeds a minimum value which is in its turn a function of the temperature in the heat store 6, the pump 7 starts in accordance with the procedure described above.

The control unit drives the pump for 2–4 minutes, thereafter stops the pump for 20–60 seconds, and repeats this for example 3 times. Thereafter, the control unit 13 provides for maintaining continuous pump operation until the solar radiation falls below the intensity indicating further operation.

If the sunbeam intensity once more rises above the value indicating start of the pump 7, the control unit 13 will select a starting procedure depending on how long the pump 7 has been inactive. If the pump 7 has been switched off for more than e.g. 15–20 minutes, the pump will be started in accordance with the above mentioned starting procedure. However, if the pump has been inactive for a shorter time than such a limit value, it is started immediately for continuous operation, i.e. the special and intermittent start-up phase is then not used.

In addition to the above mentioned functions, the control unit 13 is also able to reduce the electrical power supplied to the pump 7 according to the operating condition, in a manner corresponding to the prior art type dynamic control mentioned in the introduction, i.e. that if necessary, the pump power may be increased in order to remove heat more rapidly if the sunbeam radiation increases during operation. However, in addition it is possible to define a power function for reducing power at the same pace as the pressure reduction in the absorber, as mentioned above. The pressure reduction is determined by the time lapsed after start-up, and this time period is the function variable on the basis of which the control unit 13 regulates power.

Figure 8:
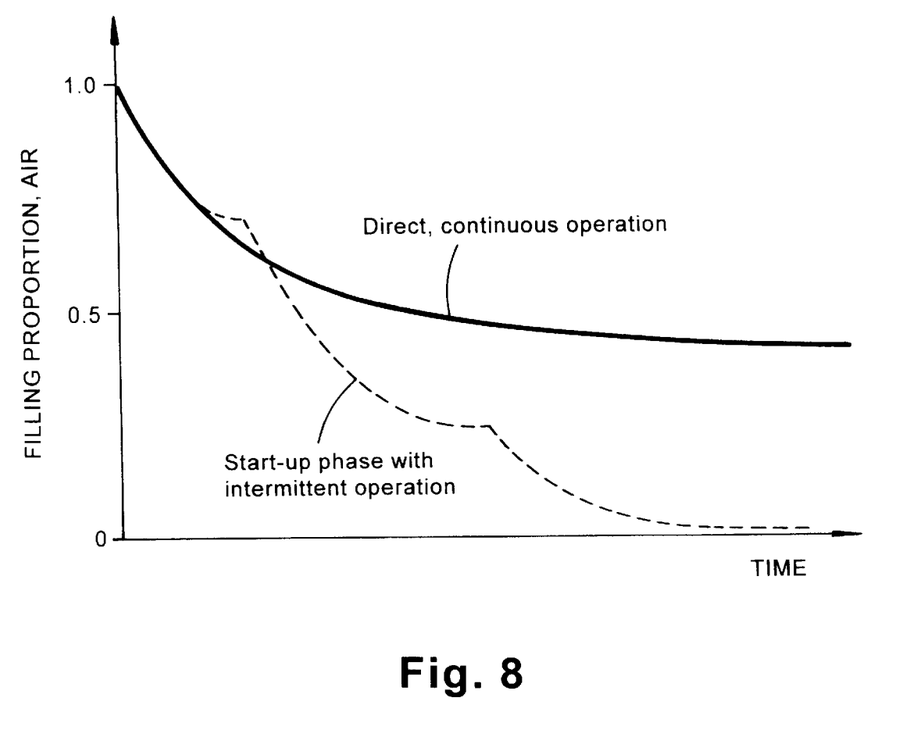
FIG. 8 shows in a diagram the air filling ratio in the absorber as a function of time, comparing the operating method in accordance with the invention to a start-up procedure of the conventional type.

In FIG. 8 is shown a comparison between the time course for absorber air filling ratio, for (a) direct starting of continuous operation, i.e. the procedure that would be selected in accordance with prior art solutions, (shown by means of a solid line), and (b) the development (shown by means of a dashed curve) in accordance with the method of the present invention. As the first stopping of the pump is effected, a deviation occurs from the fully drawn curve, but when a new start is made, i.e. at the first indicated break point, there is rapidly achieved an air filling ratio that becomes much lower than what the directly continuous operating mode is able to achieve. After another stop and start, where the start is shown clearly at the new break point, there is achieved a further lowering of the air filling ratio down toward the desired value, which is zero.

Figure 9:
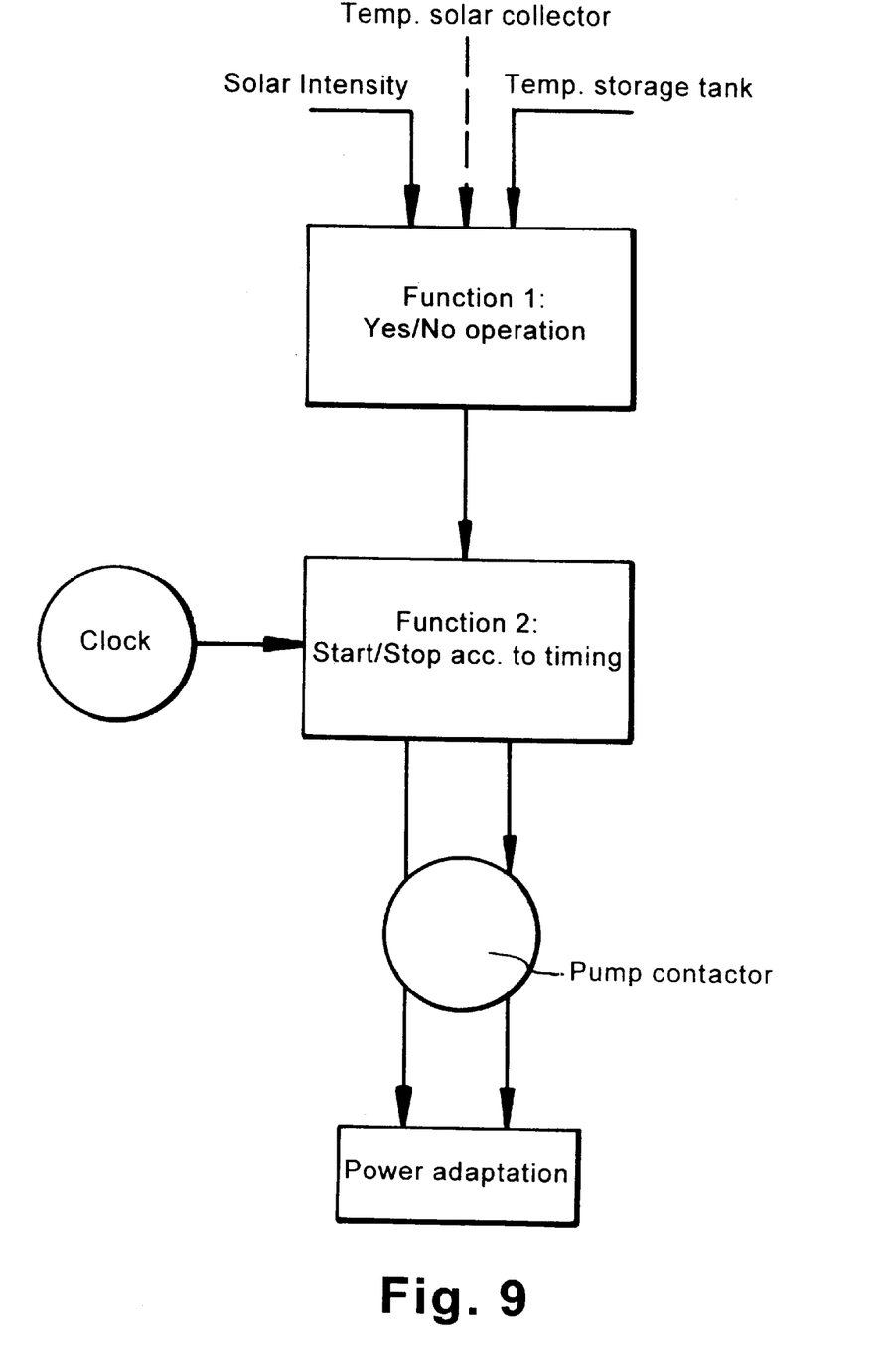
FIG. 9 shows a logic diagram for designing an automatic control unit used in connection with the invention.

In FIG. 9 appears a logic diagram for automatic control. In short, at the setout ("function 1") there is selected whether operation shall be started or not, based upon an evaluation of input values for sunbeam intensity (or absorber temperature) and the heat store temperature. At the next step, if "function 1" has as its result "yes", it is decided, under clock control, whether the pump actually shall be operated or be inactive, and during which time periods. This also includes a choice between start-up procedure or continuous operation, based upon recording lapsed inactive time for the pump before the first start. At the end of the diagram is shown a block representing the power adaptation made on the basis of the time period in which the pump has been operational, as mentioned above.

Figure 10:
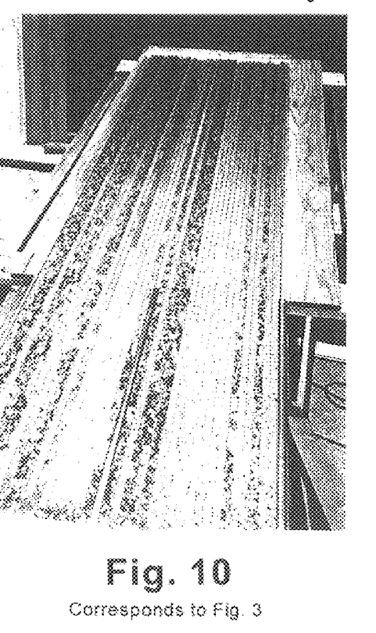
FIGS. 10–13 show photographs taken during experiments with operation in accordance with the invention, where the various photographs show filling ratios corresponding to states shown in previous drawings.
Figure 11:
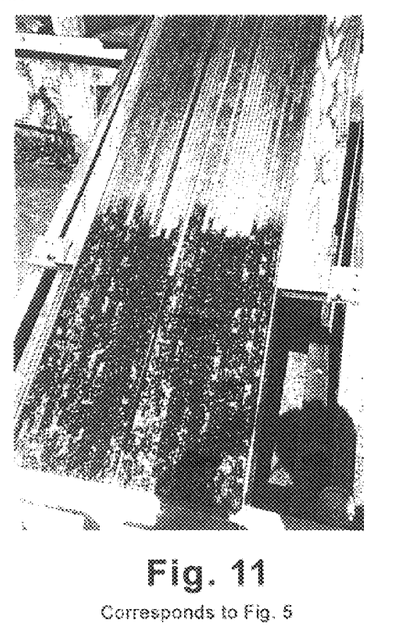

The inventors have conducted a few experiments, and as a conclusion it is referred to photographs to document that the effect achieved is a real one: FIG. 10 shows a situation corresponding to the situation shown in FIG. 3, and clearly shows that in a first phase it is difficult to obtain filling of all channels, FIG. 11 shows a situation corresponding to the situation shown in FIG. 5, i.e. subsequent to the first stop of the pump, and one sees clearly that equalization or levelling has taken place, liquid has gathered in the lower part of the absorber, and with approximately the same level in all channels.

Figure 12:
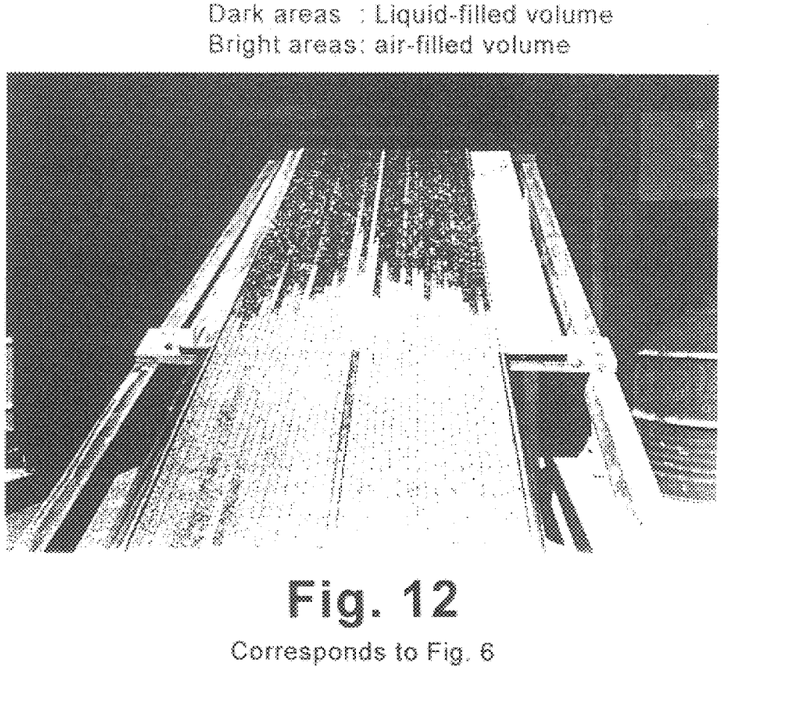
Figure 13:
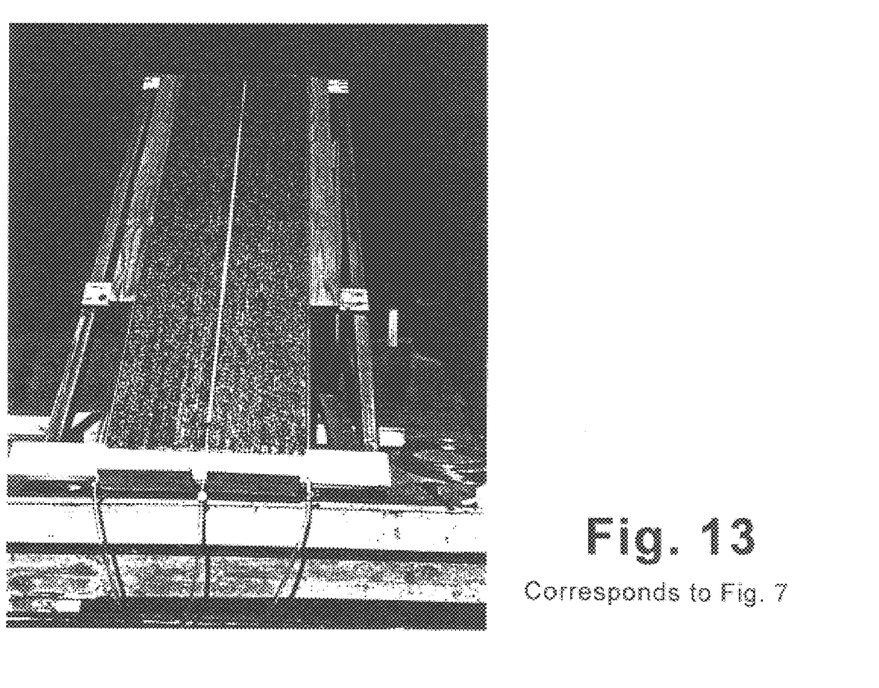

FIG. 12 and FIG. 13 then show situations corresponding to what is shown in FIG. 6 and FIG. 7, where particularly FIG. 13 shows an established and satisfactory operating situation after a few minutes of operation through a start-up phase where the method and the control unit of the present invention are used.

We claim:

1. An operating method for a solar collector plant, said solar collector plant comprising a radiation absorber (1) having a surface layer facing the sun and a downward running channel system just underneath said surface layer for conducting a liquid (12) removing heat from said surface layer, particles (11) inside the channel system for lifting said liquid (12) by capillary effect for sweeping the under side of said surface layer, and a pump (7) providing circulation of said liquid (12) through said absorber (1), a pipe system (2, 3, 4, 5), and a heat storage system (6) of the solar collector plant and operating in a start-up phase and a continuous operation phase, the operating method comprising:

driving said pump (7) intermittently in the start-up phase with a number of shut-down periods and subsequent restarts, and controlling said pump by a control unit (13), for achieving effective removal of air from the absorber channel system.

2. The method of claim 1, wherein said pump (7) is shut down in periods last of 20–60 seconds during the intermittent operation in the start-up phase.

3. The method of claim 2, wherein the start-up phase with intermittent operation is only started after an operation shut-down lasting longer than a time span of 15–20 minutes.

4. The method of claim 2, wherein the start-up phase after an operation shut-down is started by said control unit (13) based on measurement values for the intensity of the sunbeam radiation and the temperature of a heat storage tank (6).

5. The method of claim 2, wherein said pump (7) is driven for 2–4 minutes between shut-down periods.

6. The method of claim 5, wherein the start-up phase with intermittent operation is only started after an operation shut-down lasting longer than a time span of 15–20 minutes.

7. The method of claim 5, wherein the start-up phase after an operation shut-down is started by said control unit (13) based on measurement values for the intensity of the sunbeam radiation and the temperature of a heat storage tank (6).

8. The method of any of the previous claims, wherein the number of shut-down periods is two or three.

9. The method of claim 8, wherein the start-up phase with intermittent operation is only started after an operation shut-down lasting longer than a time span of 15–20 minutes.

10. The method of claim 8, wherein the start-up phase after an operation shut-down is started by said control unit (13) based on measurement values for the intensity of the sunbeam radiation and the temperature of a heat storage tank (6).

11. The method of claim 1, wherein the start-up phase with intermittent operation is only started after an operation shut-down lasting longer than a time span of 15–20 minutes.

12. The method of claim 11, wherein the start-up phase after an operation shut-down is started by said control unit (13) based on measurement values for the intensity of the sunbeam radiation and the temperature of a heat storage tank (6).

13. The method of claim 1, wherein the start-up phase after an operation shut-down is started by said control unit (13) based on measurement values for the intensity of the sunbeam radiation and the temperature of a heat storage tank (6).

14. A control unit for a pump providing liquid circulation in a solar collector plant, said solar collector plant further comprising a radiation absorber (1) having a channel system for conducting a liquid (12) removing heat from said absorber (1), a heat storage system (6) and a pipe system (2, 3, 4, 5) for transporting said liquid (12) between said absorber (1) and said heat storage system (6), said control unit (13) comprising a computer unit having a clock and controlling a switch-on and shut-down times for the pump (7), wherein said control unit (13) provides automatic intermittent operation of said pump (7) in a start-up phase in accordance with a preadjustable clock program with a preadjustable number of shut-down periods and with subsequent repeated starts, and said control unit (13) provides automatic start of said start-up phase after an operation shut-down lasting longer than a timespan related to a liquid drainage time for said absorber.

15. The control unit of claim 14, wherein the control unit is connected to a sensor (14) for solar intensity and a temperature sensor (15) in the heat storage system, said control unit (13) being adapted for starting a start-up phase after an operation shut-down on the basis of received sensor signals representing values of solar intensity toward the absorber (1) and temperature in said heat storage system (6).

* * * * *